UNITED STATES PATENT OFFICE.

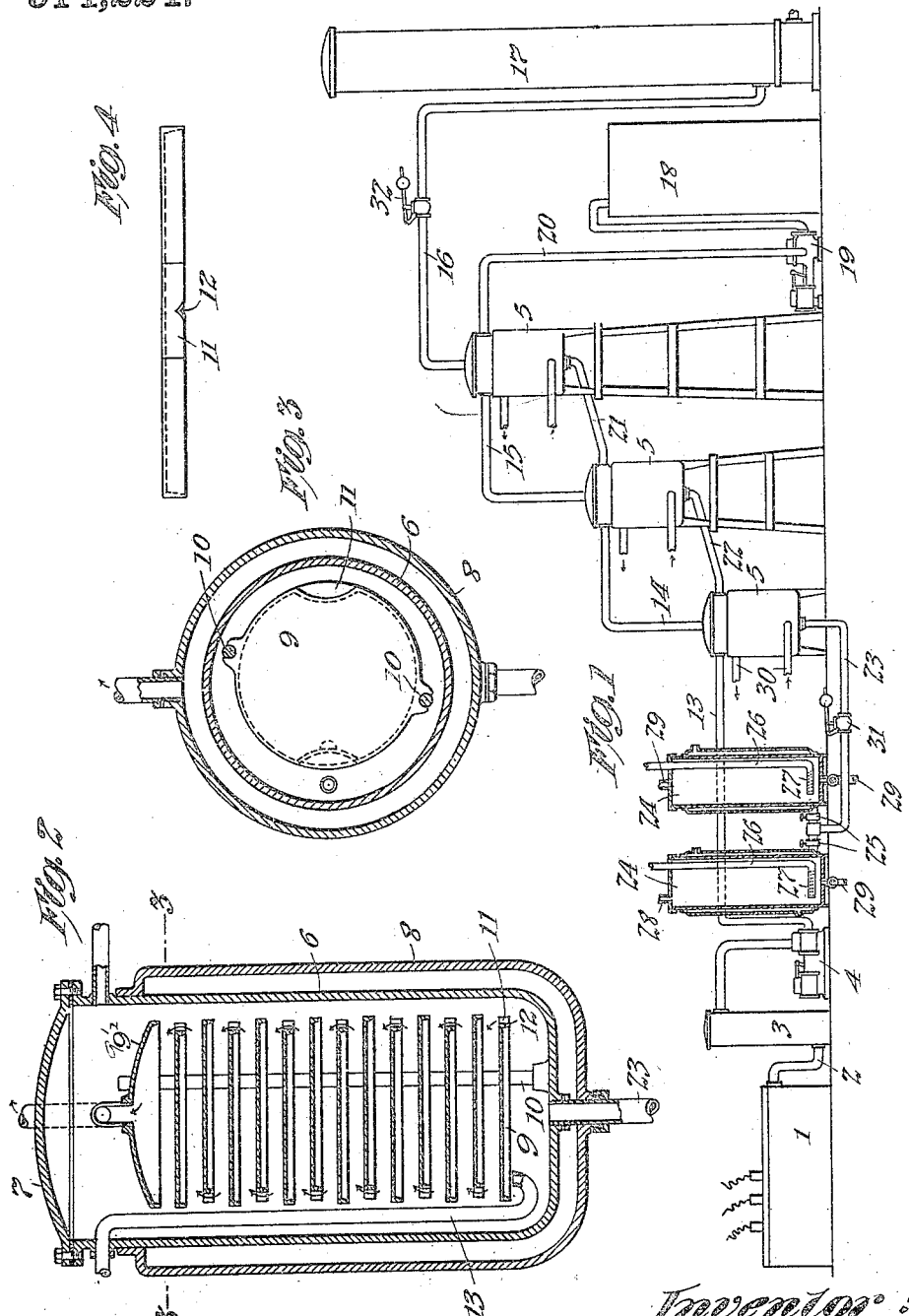

JONAS W. AYLSWORTH, OF EAST ORANGE, NEW JERSEY, ASSIGNOR, BY DIRECT AND MESNE ASSIGNMENTS, TO FIREPROOF PRODUCTS COMPANY, A CORPORATION OF NEW JERSEY.

APPARATUS FOR UTILIZING CHLORIN.

No. 914,224.  Specification of Letters Patent.  Patented March 2, 1909.

Application filed May 9, 1907. Serial No. 372,690.

*To all whom it may concern:*

Be it known that I, JONAS W. AYLSWORTH, a citizen of the United States, residing at 223 Midland avenue, East Orange, county of Essex, and State of New Jersey, have invented certain new and useful Improvements in Apparatus for Utilizing Chlorin, whereof the following is a full, clear, and exact description.

This invention relates to apparatus for utilizing chlorin; and comprises certain new and useful organizations of apparatus elements for causing chlorin, and particularly electrolytic chlorin, to react on organic substances, such organizations comprising means whereby chlorin from a suitable source, such source being preferably an electrolytic apparatus, is transmitted through a liquid or liquefied body to be chlorinated under suitable conditions of heat and pressure as a series of intercommunicating and interflowing bodies of gas, each such body being of relatively large surface area and little volume, and means for recovering the products of reaction; all as more fully hereinafter set forth and as claimed.

This apparatus is designed more particularly for the purpose of industrially utilizing the large quantities of chlorin produced in modern electrolytic methods of producing sodium and potassium, and caustic soda and caustic potash, as well as other sodium and potassium compounds, from the chlorids of sodium and potassium. The quantity of such chlorin now produced is very great and difficulties have arisen in disposing of it all at many works, owing to the limited market for bleaching powder and other chlorin products. In a copending application, Serial No. 372,689, I have described and claimed a process of utilizing such chlorin by causing it to react on hydrocarbons and other organic substances to produce hydrochloric acid as well as other useful chlorinated bodies. For instance, I have discovered that by chlorinating naphthalene, a substance of no great commercial value, I can produce certain new and useful fireproofing materials, and in another application, Serial No. 372,688, I have described fibers and similar materials fireproofed with chlorinated substances thus produced. Briefly stated, the process of Ser. No. 372,689, comprises reducing the organic material to a liquid state if not already liquid, and forcing chlorin, preferably from an electrolytic source, through the liquid, maintained under suitable conditions of heat and pressure, as a series of intercommunicating and interflowing submerged bodies of gas, each such body being of relatively large surface area and small volume, and in recovering the products of reaction. The present invention comprises apparatus useful in the operation of said process and in such other relations as it may prove suitable.

For the effective chlorination of a liquid hydrocarbon under heat and pressure, since the reaction is comparatively slow and progressively decreases in velocity as it approaches completion, it is desirable that the total area of surface of contact between gas and liquid should be as great as possible, the amount of interaction in a time unit being proportional to the contacting area at any stage of the reaction. In the present apparatus, I provide for this desirable large-area contact between gas and liquid by using a chlorinating vessel containing a series of partitions of the general shape of an inverted shallow pan, the several partitions being so arranged as to allow the gas to progress slowly and successively from the one to the other throughout the vessel, accumulating below each to form a shallow layer, pool or body of gas having a large area of contact with the liquid. The vessel is adapted to contain a body of liquid large enough to submerge the stated partitions, and to allow a feed of liquid therethrough in a direction opposite to the flow of gas. In this way, the necessary extended area of surface contact between liquid and gas is effectively maintained and the desired reactions can be caused to take place with rapidity sufficient for commercial purposes and can be carried to any extent desired. The apparatus also includes other details of construction, as well as certain combinations of devices, all as more fully hereinafter described and as claimed.

In the accompanying illustration, I have shown, more or less diagrammatically, certain embodiments of the described invention.

In this showing, Figure 1 is a view, partly in vertical section and partly in elevation, of a complete apparatus; Fig. 2 is an enlarged view in vertical section of one of the chlorinating vessels; Fig. 3 is a horizontal section on line 3—3 of Fig. 2; and Fig. 4 is a front view of one of the panlike partitions.

In this showing, element 1 is a diagrammatic showing of a source of chlorin which may be, and preferably is, an electrolytic apparatus adapted to produce chlorin from a metallic chlorid, such as, for instance, the furnace apparatus used in the so-called "Acker process." It will be understood of course that the chlorin gas may be obtained from any other cheap and copious source, but the electrolytically generated chlorin is preferable. Chlorin gas is led from this source through conduit 2 to a suitable drying apparatus 3, of any desired type, where it may be freed of any moisture and made perfectly dry, so as to permit of effective compression and so as to prevent undesired reactions due to water or water vapor in subsequent operations. Where the chlorin is generated in a dry state or where it is formed under sufficient pressure, either the drier or compressing apparatus may be omitted. As shown, the chlorin leaving the drier goes to a pumping apparatus 4, adapted to deliver it under suitable pressure to one or more chlorinating chambers or vessels (three are shown) 5. It is preferable to make use of a plurality of such vessels in order to permit an easy maintenance of differential temperatures, it being usually desirable to maintain the reacting bodies at a higher temperature near the inlet end for chlorin gas with successively lower temperatures toward the outlet end. With this temperature differential, better results are obtained since as already stated, the velocity of the reaction decreases as it approaches completion and it is desirable to accelerate this velocity with highly-chlorinated material. For the same reason, liquid and gas are caused to flow in opposite directions, the fresh chlorin gas encountering material nearly completely chlorinated while the fresh liquid meets chlorin which has gone through the apparatus and is diluted with gaseous reaction products. Operating in this manner, the rate of chlorination will be nearly uniform throughout the apparatus while uniform chlorination can be obtained.

Each chlorinating vessel, as shown, (see Fig. 2), is formed of a casing 6, provided with removable top 7, and heated in any suitable way, as by steam jacket 8. The casing or vessel is formed of any suitable chlorin-resisting material, such as lead or earthenware, of sufficient mechanical strength to withstand the pressures used. In structure, the chambers or vessels should be such as will cause extensive contact between the chlorin and liquid, and, as shown, I prefer to arrange therein a series of communicating dished partitions, 9, each having the general form of an inverted pan, arranged one above the other and supported in any suitable way, as by the vertical rods 10. Each partition is formed with a recess 11 in its rim at one side, the recess being provided with a notch 12, and in assembling the series, the several recesses are placed in a relatively staggered position so that chlorin gas escaping into the shallow chamber in the pan will travel across such chamber and escape at the opposite recess and notch into the chamber next above, and so on throughout the series. In this way there is maintained at all times a relatively large amount of chlorin gas submerged within the liquid in the form of a number of relatively shallow layers or pools, each having a very large surface contact area as compared to its volume while such gas is caused to travel slowly through the apparatus in a relatively long path, whereby an effective utilization is permitted.

As shown, chlorin is delivered from the pump to the lowermost partition in the first vessel by means of conduit 13, and travels upward through such vessel from partition to partition in the manner described, being finally collected by a special partition or hood 9′ and delivered to pipe 14. This pipe takes it to the lowermost partition in the next vessel in similar manner. The second vessel has a similar pipe 15 leading to a third vessel in like manner. From the third vessel, a similar pipe 16 leads the escaping gas, now mostly converted into HCl, into an ordinary condensing tower 17, in which the hydrochloric acid may be condensed by water in the ordinary manner, any waste gases escaping at the top, as is usual.

A material tank, 18, is provided to contain the organic material in a liquid state (such material being either normally liquid or maintained in that state by heat). From this tank it is delivered by pump 19 and conduit 20 into the upper end of the third vessel in sufficient quantity to maintain the panlike partitions submerged. Pipe 21 delivers material from the bottom of this vessel into the top of the second vessel and in like manner pipe 22 delivers material from the second to the first vessel. From the bottom of the first chlorinating vessel (the third as regards the progress of the liquid material), the completely chlorinated material passes by pipe 23 to either of a pair of receiving tanks, 24—24, valves 25 permitting either to be used. As this chlorinated material commonly contains free or dissolved chlorin, I provide these receiving tanks with means for blowing air or vapor through the liquid, such means, as shown, consisting of pipes 26 having perforated sections 27. During this treatment, the chlorinated material is commonly heated somewhat above its temperature in the chlorinating apparatus and for this purpose the receiving tanks are best provided with steam jackets. This heating further aids in maintaining the chlorinated material in a liquid condition so as to permit easy handling. Valved outlets 29 permit material to be drawn from the tanks. Pipes 30 (Fig. 1) permit the heating of the chlorinating vessels.

As it is desirable to maintain pressure within the chlorinating apparatus, I provide the liquid outlet pipe (23) with an ordinary relief valve 31, opening when a predetermined pressure is reached, and the gas outlet pipe (16) is similarly provided with relief valve 32. These relief valves in coöperation with the pump delivering chlorin to the apparatus and the pump delivering liquid to be chlorinated, enable any desired degree of pressure to be maintained within the apparatus. In adjusting these relief valves, they are so arranged that when the desired degree of pressure is attained within the chlorinating apparatus, the level of the liquid in the third and uppermost chlorinating vessel will be maintained somewhat above the uppermost partition therein to prevent the possibility of liquid being forced through pipe 16 by the gas pressure.

In operation, a suitable hydrocarbon or other organic material, either normally liquid or rendered so by heat, such as melted naphthalene, is forced by pump 19 against the pressure within the apparatus so as to fill the chlorinating chambers and submerge the partitions therein, and slowly pass relief valve 31 into either of the receiving tanks. Until the gas enters the apparatus, the liquid will fill pipes 14 and 15 and so much of pipe 13 as compression of air therein will permit. Chlorin is now forced into the apparatus by pump 4 from tower 3, entering pipe 13 and displacing air and liquid therefrom, and passing below the lowermost partition in the first vessel and thence successively below and past the succeeding partitions in all the vessels. In thus passing gradually and slowly through the vessels as a series of flowing, submerged, shallow layers, the chlorin is very effectively brought into contact with the material to be chlorinated and is effectively utilized. In chlorination of organic materials, the chlorin may be either simply absorbed, or "added," or it may be substituted for hydrogen, one atom of chlorin entering the molecule to displace an atom of hydrogen which unites with another atom of chlorin to form a molecule of hydrochloric acid. Both types of reaction generally take place, though if the hydrocarbon be what is called a "saturated hydrocarbon," only the substitution reaction occurs. Generally, the gas leaving the apparatus through pipe 16 will be substantially pure hydrochloric acid gas, the last residues of chlorin being removed from it by contact with the fresh organic material in the third vessel. This gas is absorbed in water in tower 17, giving commercial hydrochloric acid as a useful product.

By maintaining the apparatus under pressure, the effective amount of chlorin in contact with a given area of surface of liquid is materially increased and thereby the speed of the reaction. Apart from this, pressure has a specific favoring action upon the chlorinating reaction. By maintaining the first chlorinating vessel (the last as regards the liquid material) under a higher heat, the liquid which has been nearly completely chlorinated meets fresh concentrated chlorin while hot and the slackening chlorinating reaction is accelerated.

The chlorinated material entering one of the receiving tanks 24 will gradually fill the same. When filled, the stream of such material is diverted into the other tank while the material in the first tank is treated by an air blast to remove free chlorin. The material may however be washed or otherwise treated. After blowing up, the material is removed through pipe 29, leaving the tank ready for a fresh charge.

In treating naphthalene in the described apparatus, the pressure therein may be usefully maintained at 10 to 50 pounds per square inch or even more. At a temperature of 212° F., fresh naphthalene will absorb chlorin from an atmosphere of the gas at a rate of about a gram per hour per square inch of surface exposed thereto, but as chlorination progresses the rate gradually slackens till toward the end of the operation the absorption is only about 0.15 grams per square inch. With increase of pressure of the gas, the rate of absorption materially increases; and the same is true of the effect of increasing the temperature. Pressure and temperature must of course be kept within safe limits, having regard on the one hand to the strength of the apparatus and on the other to avoiding injurious effects to the organic material treated; and for commercial operations, handling naphthalene, I would not advise a temperature over 300° F. or a pressure of over 50 pounds. As previously stated, the maximum temperature preferably exists in the chamber nearest the source of chlorin while succeeding chambers, containing a less completely chlorinated, more actively reacting material are preferably maintained at a lower temperature. The pressure may be substantially the same in all. In chlorinating naphthalene, the addition of a small per cent. of a chlorin-carrier, such as antimony chlorid, greatly facilitates the reaction by its catalytic effect.

I find that naphthalene chlorinated in the described apparatus by the described method is converted into a solid wax-like material, capable of being sublimed without decomposition at about 600° F., melting about 262° F., and having a specific gravity of about 1.850. This material is soluble in chloroform, carbon tetrachlorid and naphtha. It contains about 68 per cent. chlorin. In treating other liquid or liquefiable organic materials in the described apparatus, the pressures and temperatures may be somewhat varied. When it is not important that a chlorinated organic material should be produced and when a larger yield of hydrochloric acid is desired, less resistant organic materials may be passed through the apparatus in lieu of melted naphthalene; oleic acid, for instance, being suitable. With such materials, the chlorination may be allowed to progress until about half the substitutable hydrogen is replaced, the hydrochloric acid produced being regained in the condensing tower as described. The chlorinated material thus obtained is next decomposed by a higher heat, producing more hydrochloric acid and a tarry residue. I prefer however to treat hydrocarbon material, such as naphthalene however, as such materials give rise to bodies, like the described product from naphthalene, which are useful in the arts. The naphthalene product described is a valuable fireproofer.

What I claim is:—

1. An apparatus for subjecting a liquid organic material to the effect of chlorin gas, comprising a source of chlorin, a closed chlorinating chamber for containing the liquid material, a series of inverted shallow pan-like partitions within the chamber, one above the other and below the level of the liquid material, means for supplying chlorin gas from said source to said partitions, whereby a series of separate thin bodies of gas will be maintained submerged within the liquid material, the partitions being so arranged to permit the escape of gas successively and in an upward direction to the several partitions after traveling beneath and across each successive partition.

2. An apparatus for subjecting a liquid organic material to the effect of chlorin gas, comprising a source of chlorin, a closed chlorinating chamber for containing the liquid material, means for heating the same, a series of inverted shallow pan-like partitions within the chamber, one above the other and below the level of the liquid material, means for supplying chloirn gas from said source to said partitions, whereby a series of separate thin bodies of gas will be maintained submerged within the liquid material, the partitions being so arranged to permit the escape of gas successively and in an upward direction to the several partitions, after traveling beneath and across each successive partition.

3. An apparatus for subjecting a liquid organic material to the effect of chlorin gas, comprising a source of chlorin, a closed chlorinating chamber for containing a liquid material, means for maintaining pressure therein, means for heating the same, a series of inverted shallow pan-like partitions within the chamber one above the other and below the level of the liquid material, means for supplying chlorin gas from said source to said partitions, whereby a series of separate bodies of gas will be maintained submerged within the liquid material, the partitions being so arranged as to permit the escape of the gas successively and in an upward direction to the several partitions, after traveling beneath and across each successive partition.

4. An apparatus for subjecting a liquid organic material to the effect of compressed chlorin gas, comprising a source of chlorin, a series of chlorinating chambers, means for forcing a liquid material successively through said chlorinating chambers, means for forcing chlorin gas from said source in the opposite direction through the chlorinating chambers, means for maintaining a definite pressure within said chambers, and means for recovering hydrochloric acid produced in the reaction.

5. An apparatus for subjecting a liquid organic material to the effect of compressed chlorin gas, comprising a source of chlorin, a series of chlorinating chambers, means for heating the same, means for forcing under pressure a liquid material successively through the said chlorinating chambers, means for forcing chlorin gas from said source in the opposite direction through the chlorinating chambers, means for maintaining a definite pressure within said chambers and means for recovering hydrochloric acid produced in the reaction.

6. An apparatus for subjecting a liquid organic material to the effect of compressed chlorin gas, comprising a source of chlorin, a series of chlorinating chambers, means for heating the same, means for forcing the liquid material successively through the said chlorinating chambers, means for forcing chlorin gas from said source in the opposite direction through the chlorinating chambers, means for maintaining a definite pressure within said chambers and means for recovering hydrochloric acid produced in the reaction.

7. An apparatus for subjecting a liquid organic material to the effect of compressed chlorin gas, comprising a source of chlorin, a series of chlorinating chambers, means for heating the same, means for forcing under pressure a liquid material successively through the said chlorinating chambers, means for forcing chlorin gas from said source in the opposite direction through the chlorinating chambers, pressure-controlled escape means for treated liquid and for treated gas adapted to maintain definite pressure within the appartaus, and a condensing apparatus for absorbing evolved hydrochloric acid.

8. An apparatus for subjecting a liquid organic material to the effect of compressed chlorin gas, comprising a source of chlorin, a series of chlorinating chambers, means for heating the same, means for forcing under pressure a liquid material successively through said chlorinating chambers, means for forcing chlorin gas from said source in the opposite direction through the chlorinating chambers, pressure-controlled escape means for treated liquid and for treated gas adapted to maintain definite pressure within the apparatus, and a receiving vessel for collecting chlorinated material.

9. An apparatus for subjecting a liquid organic material to the effect of compressed chlorin gas, comprising a source of chlorin, a series of chlorinating chambers, means for heating the same, means for forcing under pressure a liquid material succesively through said chlorinating chambers, means for forcing chlorin gas from said source in the opposite direction through the chlorinating chambers, pressure-controlled escape means for treated liquid and for treated gas adapted to maintain definite pressures within the apparatus, a receiving vessel for collecting the chlorinated material and an air pipe entering the receiving vessel for blowing air through the chlorinated material to remove the dissolved chlorin therefrom.

10. An apparatus for subjecting a liquid organic material to the effect of compressed chlorin gas, comprising a source of chlorin, a series of chlorinating chambers, means for heating the same, means for forcing under pressure a liquid material successively through said chlorinating chambers, means for forcing chlorin gas from said source in the opposite direction through the chlorinating chambers, pressure-controlled escape means for treated liquid and for treated gas adapted to maintain definite pressures, a receiving vessel for collecting the chlorinated material, an air pipe entering the receiving vessel for blowing air through the chlorinated material to remove the dissolved chlorin therefrom, and means for heating the receiving vessel.

11. An apparatus for subjecting a liquid organic material to the effect of compressed chlorin gas, comprising a source of chlorin, a series of chlorinating chambers, means for heating the same, means for forcing under pressure a liquid or a liquid material successively through said chlorinating chambers, means for forcing chlorin gas from said source in the opposite direction through the chlorinating chambers, pressure-controlled escape means for treated liquid and for treated gas adapted to maintain definite pressures within the apparatus, a pair of receiving vessels and an air blast in each whereby as the chlorinated material is filling one a previous supply of the material may be subjected to an air blast in the other.

12. An apparatus for subjecting a liquid organic material to the effect of compressed chlorin gas, comprising a source of chlorin, a series of chlorinating chambers, means for heating the same, means for forcing under pressure a liquid material successively through said chlorinating chambers, means for forcing chlorin gas from said source in the opposite direction through the chlorinating chambers, pressure-controlled escape means for treated liquid and for treated gas adapted to maintain definite pressures within the apparatus, a pair of receiving vessels, an air blast in each whereby as the chlorinated material is filling one a previous supply of the material may be subjected to an air blast in the other, and means for heating said receiving vessels.

13. An apparatus for subjecting a liquid organic material to the effect of compressed chlorin gas, comprising a source of chlorin, a drying chamber for drying the chlorin gas therefrom, a compressor for compressing the gas, a series of chlorinating chambers through which the gas is forced under pressure, means for passing through the chlorinating chambers in the opposite direction a supply of liquid material, means for heating the chlorinating chambers and means for maintaining definite pressures within such chambers.

14. An apparatus for subjecting a liquid organic material to the effect of compressed chlorin gas, comprising a source of chlorin, a chlorinating chamber through which gas from said source is forced under pressure, means for passing through the chorlinating chamber in the opposite direction a supply of liquid material, and regulating valves for maintaining the pressure of the gas and liquid in the chlorinating chamber.

15. In apparatus for utilizing chlorin gas evolved in electrolytic alkali manufacture, the combination with an electrolytic apparatus, and an exit therefrom for the chlorin gas, of a drying chamber for drying the chlorin gas, a compressor for compressing the gas, a chlorinating chamber through which the compressed chlorin gas is forced, and means for slowly forcing through the chlorinating chamber a liquid material.

16. In an apparatus for utilizing chlorin gas evolved in electrolytic alkali manufacture, the combination with an electrolytic apparatus, and an exit therefrom for chlorin gas, of a drying chamber for drying the chlorin gas, a compressor for compressing the gas, a chlorinating chamber through which the gas is forced, and means for forcing through the chlorinating chamber in the opposite direction, a liquid material.

This specification signed and witnessed this 7th day of May 1907.

JONAS W. AYLSWORTH.

Witnesses:
FRANK L. DYER,
FRANK D. LEWIS.